United States Patent [19]

Hoke

[11] 3,932,288

[45] Jan. 13, 1976

[54] AMINOSULFONIC ACID-HETEROCYCLO PROPANE-AMINE REACTION PRODUCTS AND FUELS AND LUBRICANTS CONTAINING SAME

[75] Inventor: Donald Irvin Hoke, Chagrin Falls, Ohio

[73] Assignee: The Lubrizol Corporation, Cleveland, Ohio

[22] Filed: July 29, 1974

[21] Appl. No.: 492,665

[52] U.S. Cl. .................. 252/33; 44/66; 44/72; 44/75; 252/47.5; 252/392
[51] Int. Cl.² .............. C10M 1/40; C10M 3/34; C10M 5/22; C10M 7/38
[58] Field of Search ......... 252/33, 47.5, 392; 44/75, 44/72, 66

[56] References Cited
UNITED STATES PATENTS

| | | | |
|---|---|---|---|
| 3,725,434 | 4/1973 | Elliott et al. | 252/47.5 |
| 3,846,316 | 11/1974 | Schiff et al. | 252/33 |

*Primary Examiner*—Delbert E. Gantz
*Assistant Examiner*—I. Vaughn
*Attorney, Agent, or Firm*—James W. Adams, Jr.; Daniel N. Hall

[57] ABSTRACT

Compositions made by reacting (A) an acylated amino hydrocarbyl sulfonic acid having an acyl portion containing a substantially saturated hydrocarbyl substituent of at least about 12 carbon atoms and bonded to the amino hydrocarbyl sulfonic acid through an acyl, acylimidoyl or acyloxy linkage, (B) a heterocyclic reagent such as an epoxide, episulfide or aziridine and (C) an amino compound having about 1 to about 400 carbon atoms or an organo-sulfide having 2 to about 50 carbon atoms are useful in fuels and lubricants as dispersants, antistatic agents and corrosion inhibitors.

12 Claims, No Drawings

AMINOSULFONIC ACID-HETEROCYCLO PROPANE-AMINE REACTION PRODUCTS AND FUELS AND LUBRICANTS CONTAINING SAME

FIELD OF THE INVENTION

This invention relates to additive compositions made by reacting an acylated amino hydrocarbyl sulfonic acid, a heterocyclic reagent and an amino compound or organosulfide. The invention is also concerned with lubricant and normally liquid fuel compositions containing such additive compositions.

BACKGROUND OF THE INVENTION

A continuing problem in the art of fuel and lubricant formulation is the improvement of performance characteristics of lubricants and normally liquid fuels. Often improved characteristics are achieved through the addition to these materials of relatively small amounts of additive compositions. Additives allow both the more efficient operation of devices using the fuels or lubricants, such as engines, transmissions, gears, etc., as well as more efficient utilization of fuels and lubricants themselves. As increasing attention is given to environmental concerns and to conservation of scarcer natural resources, the achievement of these goals becomes increasingly more desirable.

The additive compositions of the present invention, when added to lubricating oils or normally liquid fuels, increase the dispersancy of such materials, that is, the ability of such materials to retain in suspension the by-products of deterioration such as sludge which accumulates in a device during usage. These compositions are also useful in imparting to lubricants and normally liquid fuels the ability to inhibit corrosion (such as rust) of metal parts with which the lubricant or fuel may come in contact. In addition, it has been found that certain of the inventive additive compositions (viz., those containing ammonium and sulfonium groups) are capable of imparting anti-static properties to a normally liquid fuel. These properties allow a fuel to resist development of static charges during rapid transport operations such as that which occurs during loading and unloading of fuels.

DESCRIPTION OF THE PRIOR ART

U.S. Pat. No. 3,634,241 discloses lubricating oil additives made by first reacting a substituted succinic acid with a $C_{2-30}$ alkylene polyamine to form a carboxamide and then reacting said carboxamide with a $C_{12-40}$ hydrocarbyl sulfonic acid. U.S. Pat. Nos. 3,235,549, 3,364,254, and 3,544,597 as well as Canadian Pat. No. 887,672 and British Pat. No. 1,090,779 disclose amido sulfonic acids that are used primarily as monomers for polymerization reactions or as detergents for aqueous cleaning solutions. Other amidosulfonic acids have been disclosed in the prior art as lubricating oil additives. See for example U.S. Pat. Nos. 3,367,864, 3,632,613 and 3,725,434, as well as British Patent Specifications Nos. 1,121,641 and 1,194,286.

SUMMARY OF THE INVENTION

The additive compositions of the present invention are made by reacting

A. at least one acylated amino hydrocarbyl sulfonic acid or Group I or II metal salt, ammonium salt or $C_{1-8}$ amine salt thereof of at least one (i) amino hydrocarbyl sulfonic acid of the formula

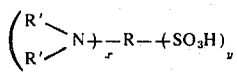   Formula I wherein R is a hydrocarbyl group of one to about 30 carbon atoms having a valency of $x+y$, each R' is independently a hydrogen atom or a monovalent hydrocarbyl group of 1 to about 18 carbon atoms with the proviso that at least one R' is a hydrogen atom, $x$ and $y$ are each independently one or two and $x+y$ is no more than 3, said acylated amino hydrocarbyl sulfonic acid having a (ii) carboxylic acid radical containing a substantially saturated hydrocarbyl substituent of at least about 12 carbon atoms and attached directly to a

group of the amino hydrocarbyl sulfonic acid (i) through an acyl, acylimidoyl or acyloxy linkage, B. at least one heterocyclic reagent selected from the group consisting of epoxides, episulfides, aziridines of the formula

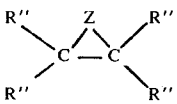   Formula II wherein Z is an oxygen or sulfur atom or a

group, R' being as defined in (A), and each R'' independently being a hydrogen atom hydrocarbyl group of 1 to about 18 carbon atoms or halo-substituted hydrocarbyl group of 1 to about 18 carbon atoms or mixtures of 2 or more of these and C. at least one (i) amino compound having 1 to about 400 carbon atoms or (ii) organo-sulfide of the general formula

   Formula III wherein each of $R^4$ and $R^5$ is independently a hydrocarbyl group of 1 to about 50 carbon atoms, or a hydroxyl-substituted hydrocarbyl group of 2 to about 50 carbon atoms and containing 1 to about 6 hydroxyl groups with the proviso that $R^4$ and $R^5$ taken together with S can form a ring of 5 to 6 annular members.

The reaction of (A), (B), and (C) can be carried out simultaneously in one step or sequentially; i.e., the reactants can be all combined together in a single step or reactant (A) may be first reacted with (B) and then reacted with (C) or alternatively, reactant (B) can be reacted first with reactant (C) and then with (A) and so on. Preferably (A) is reacted with (B) or (C) in a first step and the product thus formed is then reacted in a second step with a second reactant, said second reactant being the other of (B) and (C) not used in the first step.

This invention also includes embodiments wherein the above compositions are combined with lubricating oils or normally liquid fuels to form additive concentrates for lubricants and fuels or lubricant or fuel compositions.

DETAILED DESCRIPTION OF THE INVENTION

The N-acylated amino hydrocarbyl sulfonic acid reactants (A) used in the present invention are characterized by the presence within their structure of (i) an amino hydrocarbyl sulfonic acid portion of an amino hydrocarbyl sulfonic acid as illustrated in Formula I and (ii) at least one carboxylic acid radical containing a substantially saturated hydrocarbyl substituent of at least 12 carbon atoms selected from the group consisting of acyl, acylimidoyl and acyloxy radicals.

The carboxylic acid radical (ii) of the acylated amino sulfonic acids (A) contains a substantially saturated hydrocarbyl substituent of at least 12 carbon atoms. It should be noted that in this specification and the appended claims the use of the term "substantially saturated substituent" refers to substituents having no more than one unsaturated carbon-to-carbon linkage per every ten saturated (i.e., single bond) carbon-to-carbon linkages. Preferably such substantially saturated substituents have no more than 5% of the total number of carbon-to-carbon linkages as unsaturated linkages. When present, the unsaturated linkages preferably will be ethylenic (i.e., >C=C<) linkages. Even more preferably the hydrocarbyl substituents of the present invention will contain no unsaturation that can be detected by bromine titration.

Preferably the substantially saturated hydrocarbyl substituents of the carboxylic acid radical (ii) of reactant (A) contains about 30 to about 300 carbon atoms. While these carbon atoms can be arranged in any structural array such as aliphatic, alicyclic, aromatic, etc., groups, preferably they are substantially saturated aliphatic groups. In an especially preferred embodiment of the invention these substituents are saturated, essentially linear aliphatic groups having no more than one branching carbon group per every 6 linear carbon atoms.

The substantially saturated hydrocarbyl substituent of the carboxylic acid radical (ii) is hydrocarbyl in nature. Thus, it should be noted that, when the term "hydrocarbyl" is used in describing a substituent in this specification and the appended claims, it is intended to embrace substantially hydrocarbyl groups unless expressly stated to the contrary. "Substantially hydrocarbyl groups" are those hydrocarbyl groups which are substituted with non-hydrocarbyl substituents (such as those enumerated below) which do not significantly affect the hydrocarbyl character and nature of the group in the context of this invention. Such groups will be considered equivalent to hydrocarbyl groups by those skilled in the art to which this invention pertains.

For example, it is obvious that a purely hydrocarbyl $C_{30}$ alkyl group and a $C_{30}$ alkyl group substituted with a methyl mercapto or methoxy group would be substantially similar in their properties with regard to their use in this invention, and would in fact be recognized as equivalents by one of ordinary skill in the art. Non-limiting examples of substituents that do not significantly alter the hydrocarbyl nature of the hydrocarbyl groups of this invention are the following:

pendant ether groups (especially hydrocarbyloxy and particularly alkoxy groups of up to ten carbon atoms)
oxa linkages (e.g., —O— linkages in a hydrocarbyl chain)
nitro
cyano
fluoro
pendant thioether groups (especially $C_{1-10}$ alkyl thioethers such as methy mercapto, butylmercapto, etc.)
thia linkages (e.g., —S— linkages in the main hydrocarbyl chain)
pendant oxo group (e.g.

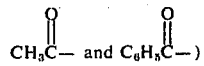

as well as oxo functions in the main chain (e.g.

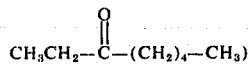

pendant sulfonyl groups (—$SO_2$—) and sulfonyl linkages in the main chain
pendant sulfinyl groups (—SO—) and sulfinyl linkages in the main chain.

Other such non-hydrocarbyl groups will be apparent to those skilled in the art.

When such non-hydrocarbyl substituents are present in the hydrocarbyl substituents of the present invention there will generally be no more than two such substituents for every ten carbon atoms in each hydrocarbyl group and, preferably, no more than one for each ten carbon atoms. Ordinarily, however, no such substituents will be present and the hydrocarbyl groups of the present invention be purely hydrocarbyl without non-hydrocarbyl substituents.

The carboxylic acid radicals (A) (ii) are normally derived from mono- or polycarboxylic acids or analogous carboxylic acid-producing compounds. Such carboxylic acid-producing compounds are well known to those of skill in the art as compounds which produce carboxylic acid moieties under the conditions of their reaction. Thus, it is well known that compounds such as anhydrides, esters, salts, amides, acyl halides, (especially acyl chlorides), etc., can often be used in place of free carboxylic acids to introduce carboxylic acid radicals into certain products such as the acylated amino hydrocarbyl sulfonic acids of the present invention. For purposes of this invention, the carboxylic acid-producing compounds used in lieu of the acid per se normally will be the anhydrides or the lower alkyl esters (e.g., where the alkyl group contains one to seven carbon atoms and usually two to four carbon atoms).

Among the suitable monocarboxylic acids useful in producing the carboxylic acid radicals (A) (ii) are saturated and unsaturated fatty acids such as lauric, stearic, oleic, arachidic, myristic acid and the like. Mono- and polycarboxylic acids substituted with relatively low molecular weight substituents such as tetrapropenyl, di(butenyl) etc., are also useful. Mixtures of two or more of such acids can also be successfully used as can the analogous acid-producing compounds exemplified above. An extensive discussion of suitable acids is found in Kirk-Othmer "Encyclopedia of Chemical Technology," second edition, 1965, John Wiley and Sons, New York, Vol. 8, pages 811–856. Among the useful relatively low molecular weight polycarboxylic acids are the dimerized and trimerized fatty acids known commonly as dimer acids and trimer acids. These are discussed in the above cited Kirk-Othmer article at pages 847–849. The indicated pages of the "Encyclopedia of Chemical Technology" is expressly incorporated herein by reference for its disclosure of suitable acids and their sources.

The preferred mono- and polycarboxylic acids used to produce the carboxylic acid (A) (ii) are relatively high molecular weight hydrocarbyl substituted carboxylic acids. These are well-known in the art and have been described in detail, for example, in U.S. Pat. Nos. 3,087,936; 3,163,603; 3,172,892; 3,189,544; 3,219,666; 3,272,746; 3,288,714; 3,306,907; 3,331,776; 3,340,281; and 3,346,354. In the interest of brevity, these patents are incorporated herein for their disclosure of suitable mono- and polycarboxylic acids which can be used to introduce a carboxylic acid radical (A) (ii) into acylated amino sulfonic acids of the present invention as well as for their disclosure of suitable acylation techniques for accomplishing this introduction.

As disclosed in the foregoing patents, there are several processes for preparing such carboxylic acids. Generally, the process involves the reaction of (1) an ethylenically unsaturated carboxylic acid, acid halide, or anhydride (i.e. a carboxylic acid reactant) of up to 20 carbon atoms with (2) an ethylenically unsaturated hydrocarbon containing at least about 30 aliphatic carbon atoms or a chlorinated hydrocarbon containing at least about 30 aliphatic carbon atoms at a temperature within the range of about 100°–300°C. More preferably these unsaturated or chlorinated hydrocarbons have at least 50 aliphatic carbon atoms. The chlorinated hydrocarbon or ethylenically unsaturated hydrocarbon reactant can contain non-hydrocarbyl, polar substituents (as described above), oil-solubilizing pendant groups, and unsaturation within the general limitations set forth hereinabove.

When preparing the carboxylic acids according to one of these two processes, the ethylenically unsaturated carboxylic acid reactant usually corresponds to the formula $R_o-(COOH)_n$ <span>Formula IV</span> with $R_o$ having up to 10 carbon atoms (preferably from 2 to about 6 carbon atoms) and being characterized by the presence of at least one ethylenically unsaturated carbon-to-carbon covalent bond and $n$ being an integer from one to six and preferably one or two. The acidic reactant can also be the corresponding carboxylic acid halide, anhydride, ester, or other equivalent acylating agent and mixtures of one or more of these. Ordinarily, the total number of carbon atoms in the acidic reactant will not exceed ten and generally will not exceed six. Preferably the acidic reactant will have at least one ethylenic linkage in an $\alpha,\beta$-position with respect to at least one carboxyl function. Exemplary acidic reactants are acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, and the like. Due to considerations of economy and availability, these acid reactants usually employed are acrylic acid, methacrylic acid, maleic acid, and maleic anhydride.

As is apparent from the foregoing discussion, the carboxylic acid used to provide the carboxylic acid radical (A) (ii) may contain cyclic and/or aromatic groups. However, the acids are essentially aliphatic in nature and, in most instances, the preferred acid acylating agents are aliphatic mono- and polycarboxylic acids, anhydrides, halides and lower alkyl esters.

The substantially saturated aliphatic hydrocarbon-substituted succinic acid and anhydrides are especially preferred as acylating agents in the preparation of the acylated nitrogen compounds of the present invention. These succinic acid acylating agents are readily prepared by reacting maleic anhydride with a high molecular weight olefin or a chlorinated high molecular weight hydrocarbon. The reaction involves merely heating the two reactants at a temperature of about 100°–300°C., preferably, about 100°–200°C. The product from such a reaction is a substituted succinic anhydride where the substituent is derived from the olefin or chlorinated hydrocarbon as described in the above cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid and either the anhydride or the acid may be converted to the corresponding acid halide or ester by reacting with phosphorus halide, phenols, or alcohols.

The ethylenically unsaturated hydrocarbon reactant and the chlorinated hydrocarbon reactant used in the preparation of the acylating agents are principally the high molecular weight, substantially saturated petroleum fractions and substantially saturated olefin polymers and the corresponding chlorinated products. The polymers and chlorinated polymers derived from mono-olefins having from two to about thirty carbon atoms are preferred. Those derived from $C_{2-6}$ 1-mono-olefins are especially preferred. Thus, exemplary of useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in whcih the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

The chlorinated hydrocarbons and ethylenically unsaturated hydrocarbons used in the preparation of the acylating agents can have number average molecular weights of about 400 to about 5,000 as determined by vapor pressure osmometry.

In lieu of the high molecular weight hydrocarbons and chlorinated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, bromo, carbonyl, and formyl radicals. Examples of these polar-substituted hydrocarbons include polypropene sulfide, dipolyisobutene disulfide, nitrated mineral oil, di-polyethylene sulfide, brominated polyethylene, etc.

The acylating agents may also be prepared by halogenating a high molecular weight hydrocarbon such as the above described olefin polymers to produce a poly-halogenated product, converting the poly-halogenated product of a polynitrile, and then hydrolyzing the polynitrile. They may be prepared by oxidation of a high molecular weight polyhydric alcohol with potassium permanganate, nitric acid, or a similar oxidizing agent. Another method for preparing such poly-carboxylic acids involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid. Monocarboxylic acid acylating agents may be obtained by oxidizing a mono-alcohol with potassium permanganate or by reacting a halogenated high molecular weight olefin polymer with a ketene. Another convenient method for preparing monocarboxylic acid involves the reaction of metallic sodium with an acetoacetic ester or a malonic ester of an alkanol to form a sodium derivative of the ester and the subsequent reaction of the sodium derivative with a halogenated high molecular weight hydrocarbon such as brominated wax or brominated polyisobutene.

Monocarboxylic and polycarboxylic acid acylating agents can also be obtained by reacting chlorinated mono- and polycarboxylic acids, anhydrides, acyl halides, and the like with ethylenically unsaturated hydrocarbons or ethylenically unsaturated substituted hydrocarbons such as the polyolefins and substituted polyolefins described hereinbefore.

The monocarboxylic and polycarboxylic acid anhydrides are obtained by dehydrating the corresponding acids. Dehydration is readily accomplished by heating the acid to a temperature above about 70°C., preferably in the presence of a dehydration agent, e.g., acetic anhydride. Cyclic anhydrides are usually obtained from polycarboxylic acids having acid radicals separated by no more than three carbon atoms such as substituted succinic or glutaric acid, whereas linear anhydrides are obtained from polycarboxylic acids having the acid radicals separated by four or more carbon atoms.

The acid halides of the monocarboxylic and polycarboxylic acids can be prepared by the reaction of the acids or their anhydrides with a halogenating agent such as phosphorus tribromide, phosphorus pentachloride, or thionyl chloride. The esters of such acids can be prepared simply by the reaction of the acid or their anhydrides with an alcohol or a phenolic compound such as methanol, ethanol, propanol, cyclohexanol, phenol, and the like. The esterification is usually promoted by the use of an alkaline catalyst such as sodium hydroxide or sodium alkoxide or an acidic catalyst such as sulfuric acid.

The second portion of the acylated amino hydrocarbyl sulfonic acids (A) of the present invention is (i) an amino hydrocarbyl sulfonic acid corresponding to Formula I. It will be apparent from the description hereinbefore that the amino hydrocarbyl sulfonic acids (i) moiety of (A) are characterized by the presence of at least one HN< or H$_2$N— group (i.e., at least one primary or secondary amino group). The radical R in Formula I can be aliphatic, alicyclic or aromatic in nature and can be di- or tri-valent as required by the nature of $x$ and $y$. Preferably R is an aromatic or aliphatic hydrocarbyl group of about 2 to about 18 carbon atoms and $x$ and $y$ are each 1.

For example, R can be aromatic in nature such as a phenylene, methyl phenylene or biphenylene unit or aliphatic in nature such as methylene, propylene, trimethylene, ethylene, octamethylene, etc. It can also be alicyclic in nature such as cyclopentyl, cyclohexyl, methyl cyclohexyl, etc. Other radicals which can be represented by R in formula (I) include the following:

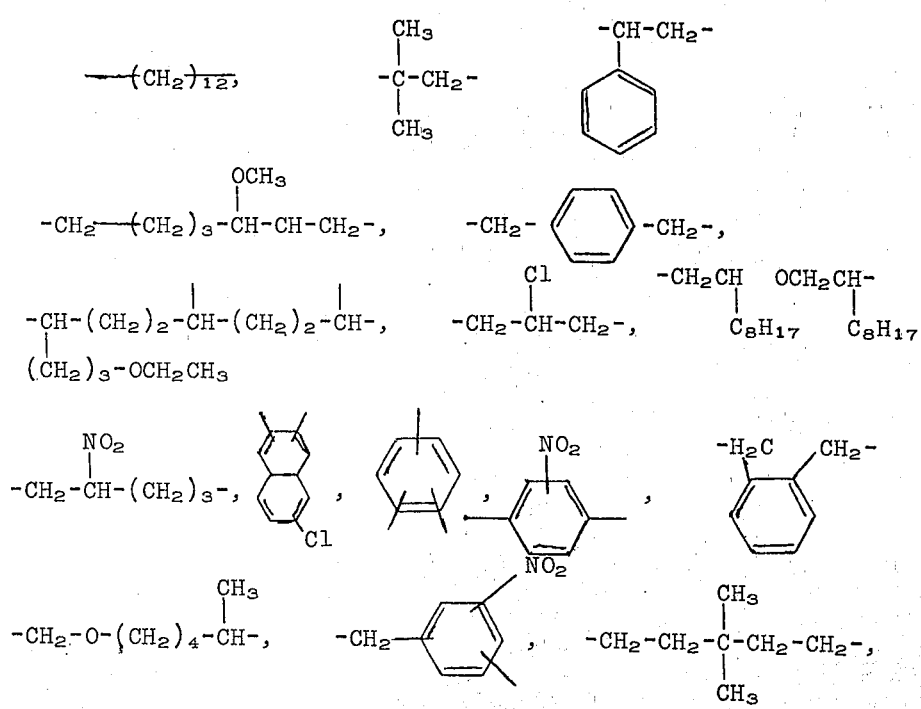

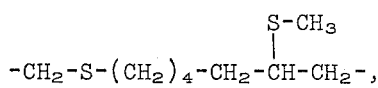
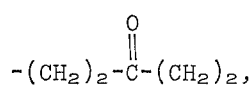
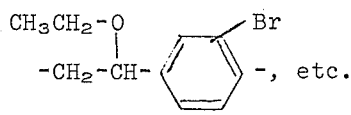
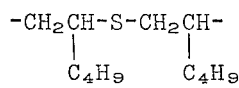

Among the particularly preferred amino aliphatic sulfonic acids are those of the formula:

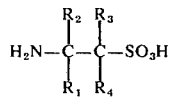   Formula V wherein $R_1$, $R_2$, $R_3$, and $R_4$ are each independently selected from the group consisting of hydrogen atoms and $C_1$ to $C_{18}$, more preferably $C_1$ to $C_{12}$, hydrocarbyl groups. In an especially preferred aspect of the invention $R_1$, $R_2$, $R_3$ and $R_4$ are each independently hydrogen or lower alkyl (that is, alkyl of up to seven carbon atoms) with the proviso that at least one is other than hydrogen. A useful method for preparing such 2-amino alkane sulfonic acids is by hydrolysis of the corresponding 2-amido alkane sulfonic acids. These amido compounds are conveniently prepared by reaction of a nitrile with an olefin in the presence of concentrated sulfuric acid. For further details, see U.S. Pat. Nos. 3,544,597 and 3,506,707; Canadian Pat. No. 704,778 and British Pat. No. 1,090,779 which are hereby incorporated by reference for their relevant disclosures in this regard.

Each R' in Formula I is independently hydrogen or a monovalent hydrocarbyl group of about 1 to about 18 carbon atoms such as an alkyl, cycloalkyl, aryl, aralkyl, alkaryl, alkenyl, cycloalkenyl group and the like. Generally they will not contain more than 12 carbon atoms each. As noted above, such hydrocarbyl groups may be also substantially hydrocarbyl in nature and contain one or more substituents such as halo, lower alkoxy, lower alkyl mercapto, nitro and the like. Generally, however, each R' when it is other than hydrogen is an alkyl, phenyl or lower alkyl substituted phenyl group of 1 to about 12 carbon atoms.

Specific examples of the

radical of Formula I are amino (i.e., —NH₂), methylamino, ethylamino, octylamino, decylamino, cyclohexylamino, N-ethylcyclopentylamino, 3-chlorocyclohexylamino, aminoethylamino, β-chloroethylamino, β-ethoxypropylamino, isopropylamino, anilino, p-nitroanilino, o-, m-, or p-anisidino, diphenylamino, allylamino, 2,4,5-trimethylanilino, and the like.

A convenient technique for preparing the N-acylated amino sulfonic acid (A) for use in the present invention comprises reacting the afore-described carboxylic acid or acid-producing acylating agent with at least one amino sulfonic acid (I) or functional derivative thereof (i.e., salt, ester, amide, halide, etc.). In such a reaction the carboxylic acylating group,

of the carboxylic acid acylating agent (where X is preferably selected from the group consisting of halogen, hydroxy, hydrocarbyloxy and acyloxy radicals) reacts directly with the HN< or H₂N— of the amino sulfonic acid (i.e., Formula I) to form an acyl, acylimidoyl or acyloxy group which links the carboxylic acid radical (i) directly to the sulfonic acid portion (i). The precise nature of the linkage is unimportant and often a mixture of the aforedescribed linkages results. Proportions of various types of linkages in such a mixture depends on the particular carboxylic acid acylating reagent, and amino sulfonic acid involved as well as the reaction temperature conditions such as reaction proportions and conditions such as temperature, ratio reactants and so on.

Usually this process is carried out by heating a mixture of at least one carboxylic acid or acid-producing acylating agent and at least one amino sulfonic acid at a temperature above about 80°C. The maximum reaction temperature is the decomposition temperature of a reactant of product present in the mixture having the lowest decomposition temperature. Preferably the reaction temperature is within the range of about 100° to about 250°C. However, when an acid or acid halide or anhydride is employed the process can be carried out at lower temperatures such as about 30°C. to obtain products having predominantly salt or salt-amide linkages. Further heating of such salts or salt amides will produce products having predominantly amide, imide, or acylimidoyl linkages by heating them to 80°C. or higher. The use of solvents such as natural or synthetic lubricating oils, aromatic, aliphatic or alicyclic hydrocarbons and halogenated derivatives of such hydrocarbons as diluents is often desirable to facilitate temperature control and further processing such as filtration.

The relative proportions of the carboxylic acid acylating agent and the amino hydrocarbyl sulfonic acid compound used are such that at least one half of the stoichiometrically equivalent amount of the amino acid is used for each equivalent of acylating agent. In this regard it should be noted that in the equivalent weight of the amino sulfonic acid compound is based on the number of non-acylated amino radicals of the general formula HN< and H₂N— which it contains. Similarly the equivalent weight of the acylating agent is based on the number of acid or acid producing groups present. Thus, 2-amino-ethane sulfonic acid has 1 equivalent per mole. N-(2-aminoethyl) sulfanilicacid has 2 equivalents per mole. A substituted succinic acid anhydride or ester has 2 equivalents per mole and so forth. The upper limit of the useful amount of amino sulfonic acid compound appears to be 4 equivalents for each equivalent of carboxylic acid acylating agent. In most instances the preferred amount of amino sulfonic acid compound is that which provides about 1 to 2 equivalents of amino hydrocarbyl sulfonic acid compound for each equivalent of carboxylic acid acylating agent.

The heterocyclic reactants (B) used to form the additive compositions of this invention are selected from the group consisting of epoxides, episulfides, and aziridines of the formula

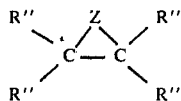

Formula II wherein Z is an oxygen or sulfur atom or an

group, R' being as defined above, and each R'' is a hydrogen atom, $C_{1-18}$ hydrocarbyl group or a $C_{1-18}$ halo-substituted hydrocarbyl group or mixtures of two or more of these. Normally, the total number of carbon atoms in the R'' groups does not exceed 30 and preferably does not exceed 20. Preferably Z is an oxygen or sulfur atom, three of the R'''s are hydrogen atoms, and the fourth R'' is a $C_{1-18}$ hydrocarbyl group or $C_{1-3}$ halo-substituted hydrocarbyl group containing 1–3 chlorine or bromine atoms. More preferably Z is an oxygen or sulfur atom, three of the R'''s are hydrogen atoms and the fourth R'' is a hydrogen atom or $C_{1-6}$ alkyl group.

Illustrative of such heterocyclic reagents are the following: ethylene oxide, ethylene sulfide, propylene oxide, propylene sulfide, styrene oxide, epichlorohydrin, 1,2-epoxy-4-chlorobutane, 2,3-epoxy-4-chlorobutane, 1,2-epoxy-5-chloropentane, 2,3-epoxy-5-chloropentane, 1,2-octadecene oxide and sulfide and so forth. The bromo and iodo analogs of the above-named compounds can also be used. Among the nitrogen-containing heterocyclic reagents useful in forming the compositions of this invention are the following: ethylene imine, N-ethyl ethylene imine, propylene imine, N-benzyl propylene imine, 1,2- and 2-3-n-butylene imine, isobutylene imine (i.e., 1,1-dimethyl ethylene imine), styrene imine (i.e., 1-phenyl ethylene imine), N-phenyl, 1,2-diphenyl ethylene imine, 1-carnoethoxy 7,8-heptadecyl imine and so forth. Mixtures of the various classes of heterocyclic reagents as well as mixtures of epoxides, episulfides and aziridines above can be used and are sometimes preferred for reasons of economy and availability.

Particularly preferred heterocyclic reagents include alkylene oxides (i.e., epoxides) of up to seven carbon atoms, especially ethylene oxide, propylene oxide, butylene oxide, as well as sulfur and hydro amino (i.e., HN<) analogs of these.

The third reactant (C) used in forming the additive compositions of this invention is selected from the group consisting of (i) amino compounds having about 1–400 carbon atoms and (ii) organo-sulfides having 2 to about 50 carbon atoms. Mixtures of two or more of these compounds can also be used. The amino compounds useful in forming the additive compositions of this invention can be relatively low molecular weight (i.e., having a total of up to about 30 carbon atoms) mono or polyamines such as the alkylene polyamines described hereinbelow and monoamines of the general formula $(R''')_3N$  Formula VI wherein each R''' group is independently a hydrogen atom, a hydrocarbyl group of 1 to about 30 carbon atoms or a hydroxyl-substituted hydrocarbyl group of 1 to about 30 carbons having up to about 3 hydroxyl groups with the proviso that the total number of carbon atoms in all the R''' groups is up to about 30. Preferably R''' is a $C_{1-18}$ hydrocarbyl group, more preferably a $C_{1-18}$ hydrocarbyl group or a $C_{2-8}$ mono-hydroxyl substituted hydrocarbyl group. The R''' groups usually will be aliphatic or alicyclic and ordinarily the hydrocarbyl portions will be saturated, branched or straight chain groups free from non-hydrocarbon substituents other than hydroxyl.

Exemplary of such relatively low molecular weight monoamines which can be reactant (C) are ammonia, ethyl amine, diethylamine, n-butyl amine, tri(isopropyl) amine, diethyl methyl amine, stearyl amine, lauryl-dimethyl amine, oleyl amine, aniline, dimethyl aniline, diphenyl amine, benzyl amine, triphenyl amine, dimethyl cyclopentyl amine, and so forth.

Exemplary of relatively low molecular hydroxyl-substituted low molecular weight amines include ethanol amine, di(3-propanol) amine, N,N-di(methyl) 4-hydroxy butyl amine, N-methyl-2-propanol amine, N, N-di(2-hydroxy ethyl) aniline and so forth.

In addition to the alkylene polyamines described hereinbelow, the relatively low molecular weight polyamines useful as reactant (C) are the phenylene diamines such as $NH_2C_6H_5NH_2$, $NH_2C_6H_5NHC_6H_5NH_2$ and their nitrogen and carbon alkyl-substituted homologs where the alkyl group contains up to eight carbon atoms and N-alkyl-1,3-diamino propanes such as N-methyl- and N, N-di-methyl-1, 3 di-amino propane,
N-n-propyl and N, N-dimethyl-1, 3-diamino propane,
N-n-hexyl and N,N'-dihexyl-1, 3-diaminopropyl,
N-dodecyl-1,3-diaminopropane,
N-methyl N-tridecyl-1,3-diaminopropane,
N-tetradecyl-1,3-diaminopropane,
N-hexadecyl-1,3-diaminopropane,
N-octadecyl-1,3-diaminopropane,
N-phenyl N-nonadecyl-1,3-diaminopropane,
N-eicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane, and so forth.

Mixtures of such compounds which are available commercially, usually at lower prices can be advantageously used as reactant (C). One such mixture is N-tallow-1, 3-diaminopropane and predominates in alkyl and alkenyl groups containing from 16 to 18 carbon atoms each, although the mixture contains a small amount of groups containing 14 carbon atoms each. Such a mixture is available from Armour Chemical Co. under the name "Duomeen T." Another mixture available commercially is N-coco-1, 3-diaminopropane which contains alkyl groups predominating in 12 to 14 carbon atoms each. Still another example is N-soya-1, 3-diaminopropane which predominates in alkenyl groups containing 18 carbon atoms per group, although it contains a small amount of alkyl groups having 16 carbon atoms each.

Alternatively, the amino reactant (C) can be a relatively high molecular weight mono- or poly-amino compound having between about 30 to about 400 carbon atoms. Illustrative of such relatively high molecular weight amino compounds are the following:

1. Ashless acylated amino dispersants made by reacting the acylating agents described hereinabove with various types of amino compounds. Such dispersants are well-known to those skilled in the art and are described, for example, in U.S. Patents:

| | | |
|---|---|---|
| 3,163,603 | 3,341,542 | 3,541,012 |
| 3,184,474 | 3,399,141 | 3,574,101 |
| 3,215,707 | 3,415,750 | 3,576,743 |
| 3,219,666 | 3,433,744 | 3,630,904 |
| 3,272,746 | 3,444,170 | 3,632,511 |
| 3,281,357 | 3,448,048 | 3,725,441 |
| 3,311,558 | 3,448,049 | Re 26,433 |
| 3,316,177 | 3,451,933 | |
| 3,340,281 | 3,467,668 | |

British Patent Specification No. 1,306,529 discloses similar materials.

2. Reaction products of aliphatic or alicyclic halides containing at least about 30 carbon atoms with amines, preferably polyalkylene polyamines. These may be characterized as "amine dispersants" and examples thereof are described, for example, in the following U.S. patents:

| | |
|---|---|
| 3,275,554 | 3,454,555 |
| 3,438,757 | 3,565,804 |

3. Reaction products of alkyl phenols in which the alkyl group contains at least about 30 carbon atoms with aldehydes (especially formaldehyde) and amines (especially polyalkylene polyamines), which may be characterized as "Mannich dispersants." The materials described in the following U.S. patents are illustrative:

| | |
|---|---|
| 3,413,347 | 3,725,480 |
| 3,697,574 | 3,726,882 |
| 3,725,277 | |

4. Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

5. Interpolymers of oil-solubilizing monomers containing a pendant alkyl group having at least about 8 carbon atoms, such as decyl methacrylate, vinyl decyl ether or a relatively high molecular weight olefin, with monomers containing nitrogen substituents, e.g., aminoalkyl acrylates, or aminoalkyl acrylamides. Also in this class are N-vinyl pyrrolidones. These may be characterized as "polymeric dispersants with pendant nitrogen-containing groups" and examples thereof are disclosed in the following U.S. patents:

| | |
|---|---|
| 3,329,658 | 3,666,730 |
| 3,449,250 | 3,687,849 |
| 3,519,565 | 3,702,300 |

6. Polymeric dispersants with nitrogen-containing groups in the main chain. Such compounds can be made by ring-opening polymerization of azacyclopropanes (such as aziridines described hereinabove) and azacyclobutanes. Another type of dispersant of this class can be made by reacting a halohydrocarbon with an alpha-beta unsaturated nitrile and then reacting the product thus formed with a polyamine as described in copending application U.S. Ser. No. 345,022, filed Mar. 3, 1973. The pertinent disclosures of all of the above-noted patents, specifications and application are incorporated by reference herein for their disclosure of amino compounds suitable as reactant (C) and sources thereof.

The ashless acylated amino dispersants are the preferred reactants (C) for use in the preparation of the additive compositions of this invention. They may be most conveniently and accurately described in terms of radicals (D) and (E) present therein. Radical (D) is at least one acyl, acyloxy or acylimidoyl radical containing at least about 34 carbon atoms, and is essentially the same as the carboxylic acid radical (A) (ii) described hereinabove. The structures of these radicals, as defined by the International Union of Pure and Applied Chemistry, are as follows (R representing a hydrocarbon or similar group):

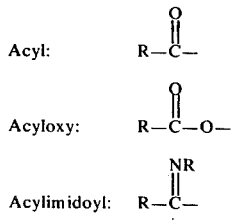

Radical (E) is preferably at least one radical in which a nitrogen atom is attached directly to said radical (D), said nitrogen atom also being attached to a hydrocarbon radical or substituted hydrocarbon radical, especially an amino, alkylamino-, or polyalkyleneamino-, substituted hydrocarbon radical.

Typical of the ashless acylated amino dispersants, are those disclosed in the above-mentioned U.S. Pat. Nos. 3,219,666 and 3,272,746 which also describe a large number of methods for their preparation. The nitrogen-containing group (E) is derived from compounds characterized by a radical of the structure >NH wherein the two remaining valences of nitrogen are satisfied by hydrogen, amino or organic radicals bonded to said nitrogen atom through direct carbon-to-nitrogen linkages. These compounds include aliphatic, aromatic, heterocyclic and carbocyclic amines as well as substituted ureas, thioureas, hydrazines, guanidines, amidines, amides, thioamides, cyanamides and the like.

Especially preferred as nitrogen-containing compounds used in the preparation of the ashless acylated amino dispersants are alkylene polyamines and hydroxyalkyl-substituted alkylene polyamines. The alkylene polyamines comprise, in general, alkylene amines containing about 10 or less alkylene groups joined through nitrogen atoms. They include principally the ethylene amines, propylene amines, butylene amines and homologs thereof, and also piperazines and aminoalkyl-substituted piperazines. Hydroxyalkyl-substituted derivatives of these alkylene polyamines are also contemplated for use in preparing the nitrogen-bridged dispersant. Typical examples of suitable amines are ethylene diamine, triethylene tetramine, pentaethylene hexamine, propylene diamine, tripropylene tetramine, di-(trimethylene) triamine, 1,4-bis-(2-aminoethyl)piperazine, 1-(2-aminopropyl)piperazine, N-(2-hydroxyethyl)ethylene diamine, 1-(2-hydroxyethyl)piperazine, and 2-heptadecyl-1-(2-hydroxyethyl)-imidazoline. Mixtures of these amines may also be used.

The preferred amines are the polyethylene polyamines containing from two to about ten amino groups per molecule. Such polyamines are described in detail under the heading "Diamines and Higher Amines" in "Encyclopedia of Chemical Technology" Second Edition, Kirk and Othmer, Volume 7, pages 27–29, Interscience Publishers, Division of John Wiley and Sons, 1965. The indicated pages of the "Encyclopedia of Chemical Technology" are incorporated herein by reference for their disclosure of suitable amines and their sources. A commercially available mixture of polyethylene polyamines containing an average of about 3–7 amino groups per molecule is particularly suitable.

For the formation of the ashless acylated amino dispersant, the particularly preferred hydrocarbon-substituted succinic anhydride or acid, or other acylating agent, and the alkylene polyamine or other nitrogen-containing reagent are heated to a temperature above about 80°C., preferably about 100°–250°C. The product thus obtained has predominantly amide, imide and/or amidine linkages (containing acyl or acylimidoyl groups). The process may in some instances be carried out at a temperature below 80°C. to produce a product having predominantly salt linkages (containing acyloxy groups). The use of a diluent such as mineral oil, benzene, toluene, naphtha or the like is often desirable to facilitate control of the reaction temperature.

The relative proportions of the acylating agent and the alkylene polyamine or the like are such that at least about one-half the stoichiometrically equivalent amount of polyamine is used for each equivalent of acylating agent. In this regard it will be noted that the equivalent weight of the alkylene polyamine is based upon the number of amine radicals therein, and the equivalent weight of the acylating agent is as discussed hereinabove with reference to the carboxylic acid radical (A) (ii). Although a minimum of one-half equivalent of polyamine per equivalent of acylating agent should be used, there does not appear to be an upper limit for the amount of polyamine. If an excess is used, it merely remains in the product unreacted without any apparent adverse effects. Ordinarily, no more than about 2 equivalents of polyamine are used per equivalent of acylating agent.

Reagent (C) can also be an organo-sulfide of the general formula $$R^4SR^5 \quad \text{Form. III}$$

wherein each of $R^4$ and $R^5$ is independently a hydrocarbyl group of 1 to about 50 carbon atoms or a hydroxyl-substituted hydrocarbyl group of 2 to about 50 carbon atoms and containing 1 to about 6 hydroxyl groups with the proviso that $R^4$ and $R^5$ each can be independently aliphatic, alicyclic or aromatic in nature and are exemplified by methyl
ethyl
propyl
isopropyl
butyl (normal, iso and tertiary)
$C_5H_{11}$ (all isomers)
$C_6H_{13}$ (all isomers)
$C_8H_{17}$ (all isomers)
etc. to $C_{50}H_{101}$
cyclohexyl
methylcyclohexyl
phenyl
tolyl (all isomers)
xylyl (all isomers)
naphthyl (all isomers)
methyl naphthyl (all isomers)
phenyl naphthyl (all isomers)
ethyl naphthyl (all isomers)
anthryl
biphenyl (all isomers)
tetralinyl The hydroxyl substituted hydrocarbyl groups that can be $R^4$ and $R^5$ correspond to the hereinabove described hydrocarbyl groups wherein at least one and up to about 6 hydrogen atoms have been replaced by hydroxyl groups. Particularly preferred $R^4$ and $R^5$ groups are $C_{1-18}$ hydrocarbyl and $C_{1-18}$ monohydroxyl-substituted hydrocarbyl groups wherein the hydroxyl group is beta (i.e. in the 2 position) relative to the sulfur atom. Especially preferred organosulfides are those in which $R^4$ and $R^5$ are the same and are each $C_{1-18}$ monohydroxyl substituted hydrocarbyl groups having the hydroxyl group in the beta position relative to the sulfur atom.

Generally it is preferred that reagents (A), (B) and (C) are reacted together in equimolar proportions to produce the additive compositions of the present invention. In certain instances, however, it may be desirable to vary the portion of one or more of reactants (B) and (C) between about 0.5 and about 5 moles per mole of (A).

The reaction of (A), (B) and (C) generally occurs between about 30°C. to the decomposition point of the reactant present having the lowest decomposition temperature. Preferably the reaction of (A), (B) and (C) takes place between about 30°C. and about 300°C., more preferably between about 50°C. and 250°C.

As noted above the order of reaction of (A), (B) and (C) is not critical to the invention and the reaction may be carried out sequentially in steps or all in one step simultaneously. Preferably, however, (A) and (B) or (C) are first reacted together in a first step to form an intermediate product which is then reacted in a second step with a second reactant which is the other of (B) and (C), not used in the first step.

In many instances the additive compositions of this invention are ammonium or sulfonium salts and these salts are among the preferred embodiments of the invention. Such salts will normally result when (C) is an organosulfide or tertiary amine. Ammonium salts can also be produced when the proportions of (A), (B) and (C) used are such as to produce quaternary nitrogen atoms in the additive compositions.

The following examples include preferred embodiments of the invention but in no way limit the scope of invention. In these examples, as elsewhere in this specification and appended claims, all percentages and parts are by weight and molecular weights are number average molecular weights ($\overline{M}n$) as determined by vapor phase osmometry or from saponification number.

EXAMPLE 1a

A mixture of 575 parts (3.28 moles) of sodium 2-amino-2-methyl propane sulfonate and 934 parts (3.28 moles) of a polypropenyl-substituted succinic anhydride ($\overline{M}n$ 284) is formed at 80°–100°C. under nitrogen. This mixture is heated to 230°C. over a period of 5 hours and then held at 230°C. for 5 hours under nitrogen. The reaction mixture is cooled to 90°C., and 274 parts of hydrochloric acid, 250 parts water and 100 parts toluene are added. This mixture is refluxed for 3 hours and then stripped until 2000 parts of product remained as residue.

EXAMPLE 1b

Triethanol amine (244 parts, 1.64 moles) is added to 1000 parts (1.64 moles) of the product of Example 1a at 50°–55°C. The temperature is maintained at 50°–55°C. and 72 parts (1.64 moles) of ethylene oxide is added over a 2 hour period. The mixture is filtered, stripped under vacuum and filtered again yielding the desired product, which contains 3.13% sulfur and 3.96% nitrogen.

EXAMPLE 2

The procedure of Example 1b is repeated except the triethanolamine is replaced by an equal molar amount of trimethylamine. The product obtained contains 3.73% sulfur and 4.4% nitrogen.

EXAMPLE 3

The procedure of Example 2 is repeated except the polypropenyl succinic anhydride is replaced by an equal molar amount of a polybutenyl succinic anhydride ($\overline{M}n$ 1110).

EXAMPLE 4a

A mixture of 6555 parts (7.94 equivalents) of a polybutenyl chloride prepared by chlorinating a polybutene ($\overline{M}n$ 1000) to a chlorine content of 4.3%, 66 parts (0.33 mole) of phenothiazine inhibitor and 851 parts (8.03 moles) 2-methylene glutaronitrile is heated at 200°–240°C. for 14 hours, then stripped under vacuum. The residue is the product containing 2.91% nitrogen.

EXAMPLE 4b

A mixture 497 parts (13.6 moles) of commercial ethylene polyamines corresponding in empirical formula to triethylene tetramine and 3270 parts (6.8 equivalents) of the product prepared in Example 4a is prepared at 116°C. This mixture is heated to 180°C. in 1.5 hours during which 12 parts of gaseous hydrogen sulfide is added. The mixture is then heated at 180°–220°C. for 10 hours and stripped under vacuum at 230°C. The residue is the desired product containing 4.32% nitrogen.

EXAMPLE 4c

A mixture of 4440 parts of a polybutenyl succinic anhydride ($\overline{M}n$ 1110), 610 parts of 2-amino-2-methyl propane sulfonic acid, 159 parts of sodium hydroxide and 870 parts of diluent oil is heated at 110°–140°C. under nitrogen for 3 hours. This mixture is heated to 230°C. while blowing with nitrogen, then cooled to 100°C. and 333 parts of aqueous hydrochloric acid, 1000 parts of toluene and 300 parts of water is added. The mixture is refluxed for 2 hours and then stripped to 155°C. while blowing with nitrogen. The residual mixture is cooled to 80°C. and 176 parts (4.0 moles) of ethylene oxide is added over a 4 hour period. Filtration provides the product; a filtrate containing 0.47% nitrogen and 1.13% sulfur.

EXAMPLE 4d

A mixture of 2830 parts (1 equivalent) of the product of Example 4c and 650 parts (2 equivalents) of the product of Example 4b is heated at 150° for 8 hours under nitrogen and filtered. The filtrate is the product and contains 1.14% nitrogen and 0.933% sulfur.

EXAMPLE 5a

A reaction mixture of 455 parts (2.6 moles) of sodium 2-amino-2-methyl propane sulfonate and 2780 parts (2.5 moles) of a polybutenyl succinic anhydride ($\overline{M}n$ 1110) is prepared at 80°–100°C. over a 0.5 hour period. The reaction mixture is stripped at 150°C. for 4 hours while being blown with nitrogen. To the residual mixture is added 1290 parts of diluent oil. It is then heated at 220°–230°C. for 8 hours while being blown with nitrogen. The mixture is cooled to 130°C. and blown with 216 parts (6 equivalents) of hydrogen chloride gas for 6 hours at 130°–135°C. Then 350 parts of aqueous hydrochloric acid is added. The mixture is stripped to 155°C. while blowing with nitrogen and filtered to provide the desired product as a filtrate containing 1.02% sulfur and 0.39% nitrogen.

EXAMPLE 5b

A mixture is prepared by the addition of 71 parts (0.3 equivalent) of a commercial mixture of $C_{14-18}$ alpha olefin oxide to 450 parts (0.3 equivalent) of the product of Example 5a and 37 parts (0.3 equivalent) of 2,2'-thiodiethanol at 65°–75°C. over 1 hour. The mixture is heated at 75°–85°C. for 3 hours and at 130°–135°C. for 7 hours. The mixture is then stripped under vacuum at 130°–135°C. and filtered. The filtrate is the product containing 2.19% sulfur and 0.34% nitrogen.

EXAMPLE 6

A mixture of 1132 parts (0.4 equivalent) of the product of Example 4c and 48 parts (0.4 equivalent) 2, 2'-thiodiethanol is heated at 95°–105°C. for 3 hours and at 130°–140°C. for an additional 4 hours. The reaction mixture is stripped at 140°–165°C. to provide as the residue 1147 parts of product.

EXAMPLE 7a

A mixture of 579 parts (0.5 moles) of a polybutenyl succinic anhydride ($\overline{M}n$ 1158), 237 parts diluent oil and 70 parts (0.5 moles) of 2-amino propane sulfonic acid is heated at 200°C. for 20 hours. The reaction mixture is cooled to room temperature and 7 parts of methanol and 76 parts (0.5 moles) of triethanol amine is added. The mixture is then heated at 175°C. and filtered. The filtrate is the product containing 1.44% sulfur and 1.34% nitrogen.

EXAMPLE 7b

The product of 7a is reacted with an equivalent amount of ethylene oxide in essentially the same manner described in Example 1b.

EXAMPLE 8a

A mixture of 2220 parts (4.0 equivalents) of a polybutenyl succinic anhydride ($\overline{M}n$ 1110), 1700 parts diluent oil and 336 parts (8 equivalents) of a commercially available mixture of ethylene polyamines having an average of 3–10 nitrogen atoms per molecule is heated at 150°–155°C. for 6 hours under nitrogen, stripped and filtered. The filtrate is the product having 2.78% nitrogen.

EXAMPLE 8b

A mixture of 2340 parts (1 mole) of the product of Example 8a and 116 parts (2.0 moles) of propylene oxide is heated at 150°C. for 3 hours. An additional 29 parts (0.5 mole) of propylene oxide is added and the mixture held at 150°C. for 1 hour. The residue is the desired product; it contains 2.43% nitrogen.

EXAMPLE 8c

A mixture of 340 parts (0.25 equivalent) of product of Example 5a and 12 parts (0.273 equivalent) of ethylene oxide is heated at 55°–60°C. for 2 hours. The residue is the product which contains 0.36% nitrogen and 1.09% sulfur.

EXAMPLE 8d

A mixture of 121 parts (0.05 equivalent) of the product of Example 8b, 65 parts (0.05 equivalent) of the product of Example 8c and 14 parts diluent oil is heated at 150°–160°C. for 8 hours under nitrogen. The reaction mixture is stripped and filtered. The filtrate is the product containing 1.62% nitrogen and 0.28% sulfur.

EXAMPLE 9a

A mixture of 2220 parts (2.0 moles) of a polybutenyl succinic anhydride ($\bar{M}n$ 1110), 450 parts (3.0 moles) of triethanol amine and 1780 parts of diluent oil is heated at 150°–160°C. for 5 hours while being blown with nitrogen. Provision is made for removing water during this step. The reaction mixture is filtered and the filtrate is the product containing 0.96% nitrogen.

EXAMPLE 9b

A mixture of 146 parts (0.1 equivalent) of the product of Example 9a, 130 parts (0.1 equivalent) of the product of Example 8c and 27 parts diluent oil is heated at 150°–160°C. for 8 hours under nitrogen. The mixture is stripped at 150°C. for 1.5 hours while being blown with nitrogen. The reaction mixture is filtered and the filtrate is the product containing 0.65% nitrogen and 0.37% sulfur.

As previously indicated, the additive compositions of this invention are useful as additives in preparing lubricant compositions where they function primarily as dispersants and corrosion inhibitors (e.g., anti-rust agents). Many such compositions are particularly useful in dispersing engine sludge and reducing corrosion of metal engine parts with which the lubricant comes in contact. The products of this invention can be employed in a variety of lubricant compositions based on diverse oils of lubricating viscosity, including natural and synthetic lubricating oils and mixtures thereof. These lubricant compositions include crankcase lubricating oils for spark-ignited and compression ignited internal combustion engines, including automobile and truck engines, two-cycle engines, rotary engines, aviation piston engines, marine and railroad diesel engines and the like. In addition, automatic transmission fluids, transaxle lubricants, gear lubricants, metal-working lubricants, hydraulic fluids and other lubricating oil and grease compositions can also benefit from the incorporation therein of the products of the present invention.

Natural oils useful in making these compositions include animal oils and vegetable oils (e.g., castor oil, lard oil) as well as liquid petroleum oils and solvent-refined or acid-refined mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecyl benzenes, tetradecylbenzenes, dinonylbenzenes, di-(2-ethylhexyl)-benzenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylolpropane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra(2-ethylhexyl)silicate, tetra-(4-methyl-2-tetraethyl)-silicate, tetra-(p-tert-butylphenyl)silicate, hexyl-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

The preferred lubricating oils which serve as base stocks for the lubricant compositions of this invention have viscosities ranging from about 100 centistokes at 0°F. to about 2000 centistokes at 210°F.

Generally, the lubricant compositions of the present invention contain an amount of the additive compositions of this invention sufficient to provide the composition with anti-corrosion and sludge dispersing properties. Normally this amount will be about 0.05 to about 20, preferably about 0.50 to about 10% of the total weight of the lubricant composition. In lubricating oils operated under extremely adverse conditions, such as lubricating oils for marine diesel engines, the reaction products of this invention may be present in amounts of up to about 30% by weight.

The lubricant compositions of the present invention can contain, in addition to the additive composition products of this invention, other additives that are normally used in lubricants. Such additives include, for example, auxiliary detergents of the ash-forming and of the ashless type, viscosity index improving agents, pour-point depressants, anti-foam agents, extreme pressure agents, rust-inhibiting agents, oxidation- and corrosion-inhibiting agents.

The normally liquid fuel compositions of this invention are generally derived from petroleum sources, e.g., normally liquid petroleum distillate fuels, though they may include those produced synthetically by the Fischer-Tropsch and related processes, the processing or organic waste material or the processing of coal, lignite or shale rock. Such fuel compositions have varying boiling ranges, viscosities, cloud and pour points, etc., according to their end use as is well known to those of skill in the art. Among such fuels are those commonly known as motor and aviation gasoline, diesel fuels, jet engine fuel, kerosene, distillate fuels, heating oils, residual fuels, bunker fuels, etc. The properties of such fuels are well known to skilled artisans as illustrated, for example, by ASTM Specifications D No. 396–73 (Fuel Oils) and D No. 439–73 (Gasolines) available from the American Society for Testing Materials, 1916 Race Street, Philadelphia, Pa. 19103.

The fuel compositions of the present invention can contain about 0.001 to about 5% (based on the weight of the final composition), preferably about 0.001 to about 1%, of the above-described additive compositions. The presence of these additive compositions imparts many desirable characteristics to the fuel composition. Thus in gasolines they improve the overall composition ability to retard corrosion of metal parts with which it may come in contact and the fuel's ability to clean carburetors and reduce carburetor icing. These products can be used in fuel oil compositions and other normally liquid petroleum distillate fuel compositions to impart anti-screen clogging and demulsifying properties to the fuel. The sulfonium and ammonium salt-containing additive compositions of this invention are particularly useful in fuels used to power jet engines where they function as anti-static agents.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, anti-oxidants such as 2,6-di-tertiary-butyl-4-methylphenol, rust inhibitors, such as alkylated succinic acids and anhydrides, bacteriostatic agents, gum inhibitors, metal deactivators, upper cylinder lubricants and the like.

The additive compositions of this invention can be added directly to the fuel or lubricant to be treated or they can be diluted with an inert solvent/diluent such as the various oils and normally liquid fuels described in detail hereinabove to form additive concentrates. These concentrates generally contain about 20 to about 90% additive composition and can contain in addition any of the above-described prior art additives, particularly the afore-described prior art additives, particularly the afore-described ashless dispersants in the aforesaid proportions.

The lubricant and fuel compositions and concentrates of this invention are exemplified by the following:

EXAMPLE 10

A gasoline having a Reid vapor pressure of 8.4 psi and containing 2.7 grams of tetraethyl lead per gallon and 15 parts per million parts of gasoline of the reaction product described in Example 2.

EXAMPLE 11

A jet fuel containing 250 parts per million parts of fuel of the reaction product described in Example 4d.

EXAMPLE 12

A motor oil graded SAE 10W-30 containing 0.5% of the reaction product described in Example 1b and other conventional additives.

EXAMPLE 13

A synthetic lubricant comprised predominantly of $C_5$–$C_7$ normal alcohol esters of pentaerythritol containing 0.15% of the reaction product described in Example 4.

EXAMPLE 14

A concentrate for use in blending jet fuels comprised of 65% of the solvent refined mineral oil having a viscosity of 100 SUS at 100°F. and 35% of the product described in Example 8d.

The additive, additive concentrate, lubricant and liquid fuel compositions of this invention have been specifically exemplified hereinabove to aid those skilled in the art in understanding and practicing the invention. Many obvious variations and departures from these specific teachings will be apparent to those of skill in the art based on principles and disclosures herein and in the prior art. Such variations and departures are contemplated as being within the scope of the present invention unless clearly excluded by the appended claims.

What is claimed is:

1. A lubricant composition comprising a major amount of lubricant and a minor but sludge dispersing and/or corrosion inhibitive amount of an additive composition made by reacting (A) at least one acylated amino hydrocarbyl sulfonic acid or Group I or II metal salt, or ammonium salt of $C_{1-8}$ amine salt thereof, of at least (i) one amino hydrocarbyl sulfonic acid of the formula

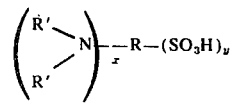

wherein R is a hydrocarbyl group of one to about thirty carbon atoms having a valency of $x + y$, each R' is independently a hydrogen atom or a monovalent hydrocarbyl group of one to about 18 carbon atoms, with the proviso that at least one R' is a hydrogen atom, $x$ and $y$ are each independently 1 or 2 and $x + y$ is no more than 3, said acylated amino hydrocarbyl sulfonic acid having a (ii) carboxylic acid radical containing a substantially saturated hydrocarbyl substituent of at least about 12 carbon atoms and attached directly to an amino group of the amino hydrocarbyl sulfonic acid (i)

through an acyl, acylimidoyl or acyloxy linkage; (B) at least one heterocyclic reagent selected from the group consisting of epoxides, episulfides and aziridines of the formula

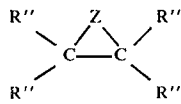

wherein Z is an oxygen or sulfur atom or an —NR'— group, R' being as defined in (A) and each R" independently being a hydrogen atom, hydrocarbyl group containing 1 to about 18 carbon atoms or halo-substituted hydrocarbyl group of one to about 18 carbon atoms or mixtures of two or more of these; and (C) at least one (i) amino compound having one to about 400 carbon atoms or (ii) organo sulfide of the general formula $R^4SR^5$ wherein each of $R^4$ and $R^5$ is independently a hydrocarbyl group of one to about 50 carbon atoms or a hydroxyl-substituted hydrocarbyl group of 2 to about 50 carbon atoms and containing 1–6 hydroxyl groups with the proviso that $R^4$ and $R^5$ can be taken together with S to form a ring of 5 to 6 annular members.

2. A composition as claimed in claim 1 wherein the R group of (A)(i) is an aromatic or aliphatic hydrocarbyl group of about 2 to about 18 carbon atoms and $x$ and $y$ are each 1 and (A)(ii) contains a hydrocarbyl substituent of about 30 to about 300 carbon atoms.

3. A composition as claimed in claim 2 wherein (C) is a high molecular weight mono- or polyamino compound having between about 30 and about 300 carbon atoms.

4. A composition as claimed in claim 2 wherein (C) is an organo-sulfide of the formula $R^4SR^5$ and the additive composition is made by reacting (A) with (B) or (C) in a first step to form an intermediate product and then reacting that intermediate product in a second step with a second reactant which is the other of (B) or (C) not used in the first step.

5. A fuel composition comprising a major amount of a normally liquid fuel and a minor, but sufficient to impart carburetor detergent and/or anti-static properties, amount of an additive composition made by reacting (A) at least one acylated amino hydrocarbyl sulfonic acid or Group I or II metal salt, or ammonium salt of $C_{1-8}$ amine salt thereof, of at least (i) one amino hydrocarbyl sulfonic acid of the formula

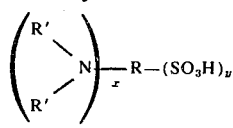

wherein R is a hydrocarbyl group of one to about thirty carbon atoms having a valency of $x + y$, each R' is independently a hydrogen atom or a monovalent hydrocarbyl group of one to about 18 carbon atoms, with the proviso that at least one R' is a hydrogen atom, $x$ and $y$ are each independently 1 or 2 and $x + y$ is no more than 3, said acylated amino hydrocarbyl sulfonic acid having a (ii) carboxylic acid radical containing a substantially saturated hydrocarbyl substituent of at least about 12 carbon atoms and attached directly to an amino group of the amino hydrocarbyl sulfonic acid (i) through an acyl, acylimidoyl or acyloxy linkage; (B) at least one heterocyclic reagent selected from the group consisting of epoxides, episulfides and aziridines of the formula

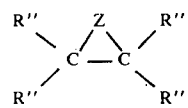

wherein Z is an oxygen or sulfur atom or an —NR'— group, R' being as defined in (A) and each R" independently being a hydrogen atom, hydrocarbyl group containing 1 to about 18 carbon atoms or halo-substituted hydrocarbyl group of one to about 18 carbon atoms or mixtures of two or more of these; and (C) at least one (i) amino compound having one to about 400 carbon atoms or (ii) organo sulfide of the general formula $R^4SR^5$ wherein each of $R^4$ and $R^5$ is independently a hydrocarbyl group of one to about 50 carbon atoms or a hydroxyl-substituted hydrocarbyl group of 2 to about 50 carbon atoms and containing 1–6 hydroxyl groups with the proviso that $R^4$ and $R^5$ can be taken together with S to form a ring of 5 to 6 annular members.

6. A fuel composition as claimed in claim 5 wherein the R group of (A)(i) is an aromatic or aliphatic hydrocarbyl group of about 2 to about 18 carbon atoms and $x$ and $y$ are each 1 and (A)(ii) contains a hydrocarbyl substituent of about 30 to about 300 carbon atoms.

7. A fuel composition as claimed in claim 6 wherein (C) is a high molecular weight mono- or polyamino compound having between about 30 and 300 carbon atoms.

8. A fuel composition as claimed in claim 6 wherein (C) is an organo-sulfide of the formula $R^4SR^5$ and the additive composition is made by reacting (A) with (B) or (C) in a first step to form an intermediate product and then reacting that intermediate product in a second step with a second reactant which is the other of (B) or (C) not used in the first step.

9. An additive concentrate comprising about 20 to about 90 percent of the additive composition of claim 1 and an inert solvent diluent.

10. An additive concentrate comprising about 20 to about 90 percent of the additive composition of claim 2 and an inert solvent diluent.

11. An additive concentrate comprising about 20 to about 90 percent of the additive composition of claim 3 and an inert solvent diluent.

12. An additive concentrate comprising about 20 to about 90 percent of the additive composition of claim 4 and an inert solvent diluent.

* * * * *